April 15, 1941.  I. SANCHEZ  2,238,187
SHIELD FOR AUTOMOBILES
Filed May 5, 1938
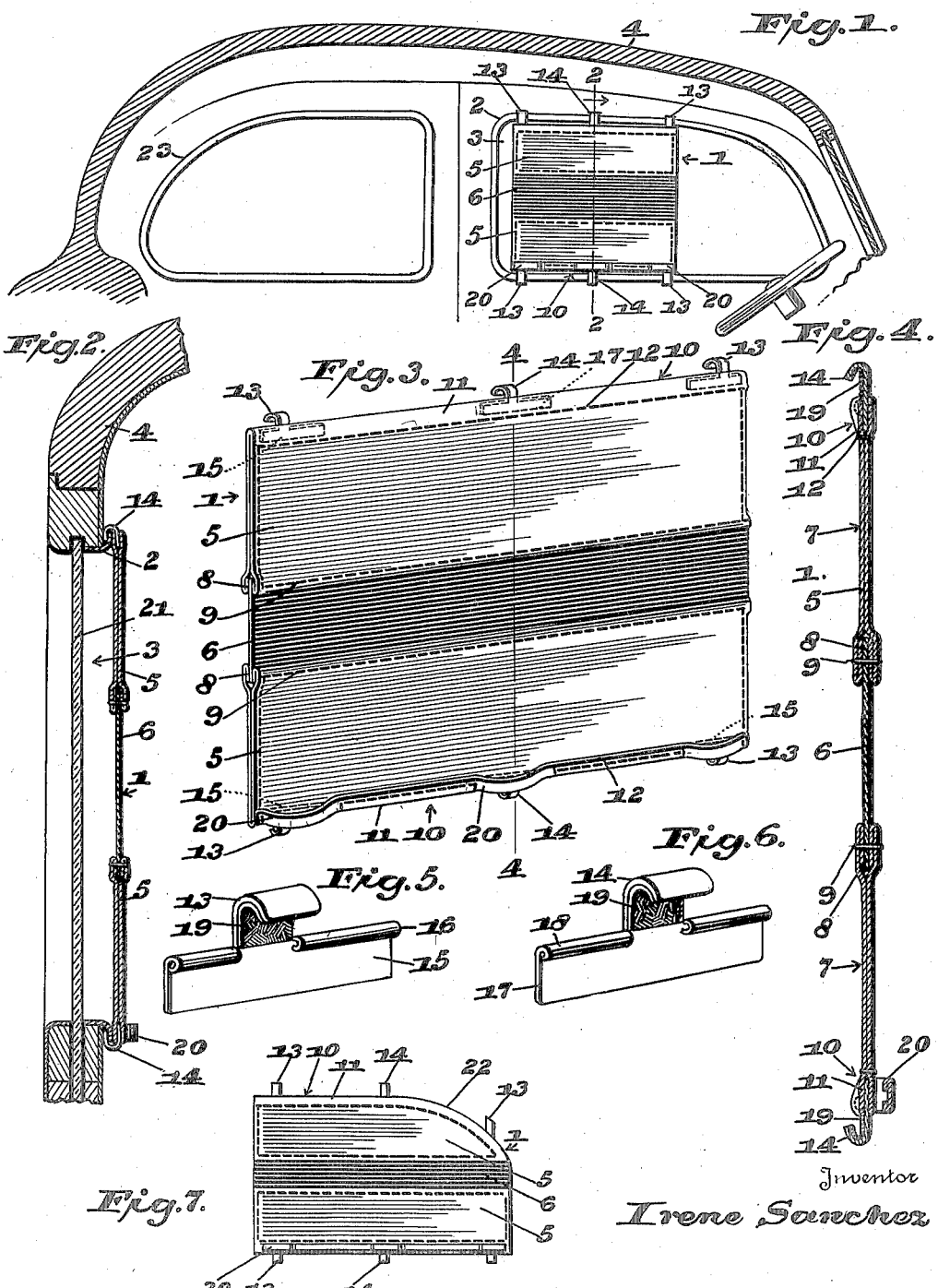
Inventor
Irene Sanchez
By Munn, Anderson & Liddy
Attorney Patented Apr. 15, 1941

2,238,187

UNITED STATES PATENT OFFICE 2,238,187

SHIELD FOR AUTOMOBILES

Irene Sanchez, St. Augustine, Fla.

Application May 5, 1938, Serial No. 206,285

2 Claims. (Cl. 296—97)

This invention relates to improvements in shields, especially of the type adaptable to automobile windows. One of the main purposes of the shield is to provide safety and protection for the driver, who may be blinded by flashing side lights caused when a vehicle moves past a stationary object. It is important to note that this shield therefore is particularly adaptable and useful for late afternoon driving when the lowering sun strikes the driver on a line with his eyes, creating dangerous glare and a real hazard to safety. Another purpose of the shade, which will appeal particularly to the motorist or truck driver who has to drive continuously in the sun, is that the shield will prevent the discomfort of sunburn.

Another object of the shield is to keep out rain, in the event that it is desired to drive with the windows down, and in the latter respect the operation of the windows is not affected by the presence of the shield in its position upon the respective window frame. With this premise in mind, the objects of the invention are as follows:

First, to provide an automobile window sunshade which is applicable from the inside of the vehicle by merely hooking it onto the window framework at the top and bottom.

Second, to provide a shield which is adaptable both to one or two selected windows in order to keep out the sunlight and to all of the windows if it is desired to make the interior of the automobile private.

Third, to provide a shield which does not interfere with the operation of the window when applied.

Other objects and advantages will appear in the following specification, reference being had to the accompanying drawing, in which:

Figure 1 is a sectional view of a portion of an automobile, showing the shield in place on one of the window frames, Figure 2 is a cross sectional view taken on the line 2—2 of Fig. 1, illustrating how the shield is emplaced on the window framework, Figure 3 is a perspective view of the shield, Figure 4 is a vertical section taken on the line 4—4 of Figure 3, Figure 5 is a perspective view of one of the end hooks, Figure 6 is a perspective view of one of the mid-hooks, and, Figure 7 is a detail side elevation of a slightly modified form of the shield.

In carrying out the invention the shield, generally designated 1 (Fig. 3) is attachable to the framework 2 around the respective opening 3 of the automobile 4. The latter is here illustrated as of the passenger type, but obviously the shield is adaptable to any motor vehicle, whether propelled over land, water, or through the air. Said shield is generally of a size sufficiently large to close a substantial portion of a window opening as illustrated in Fig. 1.

Attention is directed to Fig. 3 for the details of the shield. It comprises at least one inherently inelastic closure panel 5 and a connector panel 6 of elastic material. The instant illustration is based on a pair of spaced closure panels 5, of which the element 6 is the elastic connector. In each instance the panels 5 and 6 are coextensive with each other.

The panels 5 are preferably composed of duck. The duck will be of a desired weight, and it may be either single or double. The double construction, shown at 7 in Fig. 4, is preferred because then the parallel longitudinal edges 8 of the elastic connector 6 can be inserted as shown, and secured to the contiguous edges of the panels 5 by stitching 9. On this wise the remote longitudinal edges 10 of the shield are readily formed into tunnels 11 by the rows of stitching 12 for the reception of the bases of the end and mid-hooks 13, 14.

One of the end hooks is shown in Fig. 5. The hook 13 is off-center in respect to the base 15. The advantage of this arrangement is that it provides a rather long base and yet locates the hook sufficiently far toward one side so that when the shield is applied (Fig. 1) there will be little if any possibility of the nearest vertical edge sagging for want of support. The upper edge of the base 5 is rolled at 16 so as to provide a rounded top portion which will not cut through the fabric.

The mid-hook 14 is of the same general construction as each of the end hooks, the exception being that here the hook is centered in respect to its base 17. The upper edge of the latter is rolled at 18 for the purpose already described. In each instance the inside surfaces of the hooks have a covering 19 of felt, rubber, or the like to prevent marring the finish of the framework.

Finger holds 20 (Fig. 3) supplement the bottom tunnel 11. The operator places one or two fingers in these holds, after having engaged the top hooks with the top of the framework 2, thereupon pulling down sufficiently far to engage the bottom hooks with the bottom part of the framework (Fig. 2).

The sunshade is to be made from ten to twelve inches wide as it does not cover the entire window when used on the front window for this would shut off the vision of the driver. This narrowed front window shade can readily be slipped backward or forward on framework to shield the driver from the sun as its position shifts or changes according to changes in the direction of the highway being travelled. When emplaced on other windows of the automobile, the sunshade can be made wider if desired.

In applying the shield in this manner the elastic connector 6 is stretched. Although the panels 5 are preferably made of duck yet the elastic will hold the shield stretched with sufficient tightness that there will not be any flapping even when driving the automobile at a high speed. It is readily seen that a sufficient number of the shields will enable virtually shutting off the entire interior of the automobile, for instance, when the latter is taken to a bathing beach and used as a dressing room.

It is also important to note that the shield is attached to the window framework from and to the inside. The window 21 (Fig. 2) can be raised and lowered without any interference whatsoever.

Fig. 7 is a modification of the shield 1 only to the extent of rounding off the top panel at 22 to accommodate the shape of the curved window frame 23 (Fig. 1). In its other respects the shield in Fig. 7 is identical with the shield in Fig. 3, as denoted by the corresponding reference numerals.

If it is desired to make the shield narrower than a given window it is possible to push the two edges of the shield toward the center with the three hooks still remaining on the framework. It is also possible to fold the shade approximately in half, letting the folded part lap behind the other part which will be connected by two pairs of hooks. This particular use, however, has no direct bearing on the invention, the latter comprising the particular and advantageous structure described above.

I claim:

1. A shield primarily applicable to portions of a projecting framework around a window opening, comprising a pair of inherently inelastic panels, tunnels embodied in the remote edges of said panels and being assured of the permanence of their tunnel formation because of the inelasticity of the respective panels, hooks arranged along said edges to engage said frame work portions and having bases pocketed in said tunnels to provide an adequate foundation for the hooks, and an elastic connector joining the panels in the middle of the shield to exercise a pull on the hooks when the shield is mounted in said opening.

2. A shield comprising a pair of canvas panels, an elastic panel connecting the near edges of said canvas panels, tunnels along the remote edges of the canvas panels, and a series of hooks situated along said edges and adapted for attachment to the projecting frame work of a window opening, each of the hooks having bases pocketed in the tunnels, the end hooks being off-centered in respect to the bases and toward the contiguous side edges of the shield to keep said edges from sagging.

IRENE SANCHEZ.